(12) United States Patent
Sirbu Villa

(10) Patent No.: US 11,794,998 B2
(45) Date of Patent: Oct. 24, 2023

(54) CUP DISPENSER FOR A BEVERAGE VENDING MACHINE

(71) Applicant: EVOCA S.P.A., Milan (IT)

(72) Inventor: Dan Alexie Sirbu Villa, Milan (IT)

(73) Assignee: EVOCA S.P.A., Milan (IT)

( * ) Notice: Subject to any disclaimer, the term of this patent is extended or adjusted under 35 U.S.C. 154(b) by 103 days.

(21) Appl. No.: 17/626,026

(22) PCT Filed: Jul. 10, 2020

(86) PCT No.: PCT/IB2020/056510
§ 371 (c)(1),
(2) Date: Jan. 10, 2022

(87) PCT Pub. No.: WO2021/005569
PCT Pub. Date: Jan. 14, 2021

(65) Prior Publication Data
US 2022/0250836 A1    Aug. 11, 2022

(30) Foreign Application Priority Data

Jul. 11, 2019 (IT) .......................... 102019000011535

(51) Int. Cl.
*G07F 13/10* (2006.01)
*B65G 1/04* (2006.01)
*B65G 1/10* (2006.01)

(52) U.S. Cl.
CPC ............ *B65G 1/0471* (2013.01); *B65G 1/10* (2013.01); *G07F 13/10* (2013.01)

(58) Field of Classification Search
None
See application file for complete search history.

(56) References Cited

U.S. PATENT DOCUMENTS

| 3,283,951 A | 11/1966 | Gladfelder |
| 3,807,600 A | 4/1974 | Moss et al. |
| 8,519,700 B2 | 8/2013 | Jerance et al. |
| 8,763,637 B2 | 7/2014 | Soldo et al. |

(Continued)

FOREIGN PATENT DOCUMENTS

| EP | 0339946 A2 | 11/1989 |
| GB | 1604306 A | 12/1981 |

(Continued)

OTHER PUBLICATIONS

International Preliminary Report on Patentability for International Application No. PCT/IB2020/056510 dated Sep. 20, 2021.

(Continued)

*Primary Examiner* — Gene O Crawford
*Assistant Examiner* — Ayodeji T Ojofeitimi
(74) *Attorney, Agent, or Firm* — DORSEY & WHITNEY LLP

(57) ABSTRACT

A cup dispenser comprising a cup-holder turret comprising a plurality of columns containing respective stacks of cups and each provided with an associated cup release device operable to release individual cups from the stack of cups; and an electronically-controllable actuator assembly comprising a first electric actuator to rotate the cup-holder turret; and a second electric actuator to operate the cup release devices of the columns.

11 Claims, 11 Drawing Sheets

(56) References Cited

U.S. PATENT DOCUMENTS

| | | | |
|---|---|---|---|
| 2008/0309324 A1 | 12/2008 | Stuve et al. | |
| 2014/0001195 A1* | 1/2014 | Patterson ............. | B65G 59/106 221/13 |
| 2020/0100626 A1* | 4/2020 | Gentry .................... | A47F 1/085 |
| 2022/0267135 A1* | 8/2022 | Degnan ................ | B67D 1/0875 |

FOREIGN PATENT DOCUMENTS

| | | |
|---|---|---|
| GB | 2402386 A | 12/2004 |
| WO | 2013033026 A1 | 3/2013 |
| WO | 2017158555 A1 | 9/2017 |

OTHER PUBLICATIONS

International Search Report and Written Opinion from International Application No. PCT/IB2020/056510 dated Sep. 7, 2020.

* cited by examiner

CUP DISPENSER FOR A BEVERAGE VENDING MACHINE

CROSS-REFERENCE TO RELATED APPLICATIONS

This patent application is a U.S. National Stage of PCT International Application No. PCT/IB2020/056510 filed 10 Jul. 2020, which claims priority to Italian Patent Application No. 102019000011535 filed on 11 Jul. 2019, the entire disclosure of which is incorporated herein by reference.

TECHNICAL FIELD OF THE INVENTION

The present invention relates to the field of cup dispensers, which have advantageous, although not exclusive, application in beverage vending machines, to which the following description will refer without thereby losing in generality.

STATE OF THE ART

In the vending sector it is known to have cup dispensers inside beverage vending machines and generally comprising a cup-holder turret, which is formed by a plurality of columns housing respective stacks of cups and is mounted to rotate around a central axis to carry one column at a time to a cup release station, where a cup is separated from the bottom of the stack of cups and made available for filling with a beverage. There are many types of cup dispensers on the market, which can be conceptually grouped into three main categories.

A first category includes cup dispensers in which the columns have the simple function of containers for stacks of cups and are configured to engage, when carried individually in the cup release station, a common cup release device operable to detach one cup at a time from the stack of cups.

The dispensers described in U.S. Pat. Nos. 3,283,951 A, 3,807,600 A, and WO 2013/033026 A1, for example, belong to this category.

These dispensers generally have a relative structural simplicity, but suffer from the limitation of not being usable for dispensing differently sized cups. In fact, every time a column is brought to the cup release station, the stack of cups non-reversibly engages the cup release device and, hence, the changing of the columns in the cup release station is possible only after the stack of cups that previously engaged the release device has run out.

A second category includes cup dispensers in which the columns, in addition to having the function of containers for the stacks of cups, are equipped with associated cup release devices selectively operable by a common actuator arranged in the cup release station.

The dispensers described in EP 0 339 946 A2, GB 2 402 386 A, and GB 1 604 306 A, for example, belong to this category.

The fact that each column is equipped with a respective release device allows each column to contain a stack of cups with a size that may be from those of the stacks of cups contained in other columns and the columns to be selectively brought to the cup release station depending on the cup to be filled with the user-selected beverage.

However, this advantage in terms of the variety of dispensable cups results, in general, in a higher structural complexity, in particular as regards the aforementioned common actuator, which must be configured so as to fail to interfere with the columns and the associated cup release devices during rotation of the cup-holder and, at the same time, must be able to precisely and stably, but also quickly releasably engaged by the cup release device arranged in the cup release station so as to be operated if a cup is requested to be dispensed or to be left free to move away as a consequence of the rotation of the cup-holder turret if a change of cup size is requested or the column has emptied.

To overcome this drawback, WO 2017/158555 A1 to the Applicant proposes a cup dispenser comprising a first actuator to cause the cup-holder to rotate about its own rotation axis and selectively bring the columns in a fixed cup dispensing station, a second actuator to operate the cup release device of the column arranged in the cup dispensing station, and a power take-off driven by the second actuator and selectively movable, by a third actuator, between an inoperative position where the power take-off fails to interfere with the cup release devices that move through the cup dispensing station as a consequence of the rotation of the cup-holder turret, and a kinematic coupling position in which the power take-off is coupled with a power intake of the cup release device arranged in the cup dispensing station, and is maintained only for the time necessary for dispensing a cup.

OBJECT AND SUMMARY OF THE INVENTION

The object of the present invention is to provide an electronic control system for a cup dispenser of the type described in WO 2017/158555 A1 and capable of in an efficiently, precisely and reliably controlling rotation of the cup-holder turret.

According to the present invention, a cup dispenser is provided, as claimed in the appended claims.

DETAILED DESCRIPTION OF PREFERRED EMBODIMENTS OF THE INVENTION

The present invention will now be described in detail with reference to the accompanying drawings to enable a person skilled in the art to implement and use it. Various modifications to the described embodiments will be immediately apparent to those skilled in the art and the generic principles described can be applied to other embodiments and applications without thereby departing from the protection scope of the present invention, as defined in the appended claims. Therefore, the present invention should not be considered as limited to the described and illustrated embodiments, but it should be given the widest protection scope in accordance with the features described and claimed.

Unless otherwise defined, all the technical and scientific terms used herein have the same meaning commonly used by people of ordinary skill in the field pertaining to the present invention. In case of conflict, the present description, including the definitions provided, will be binding. Furthermore, the examples are provided for illustrative purposes only and as such should not be considered limiting.

In order to facilitate the understanding of the embodiments described herein, reference will be made to some specific embodiments and a specific language will be used to describe them. The terminology used in the present document is intended to describe only particular embodiments, and is not intended to limit the scope of the present invention.

Figure 1:
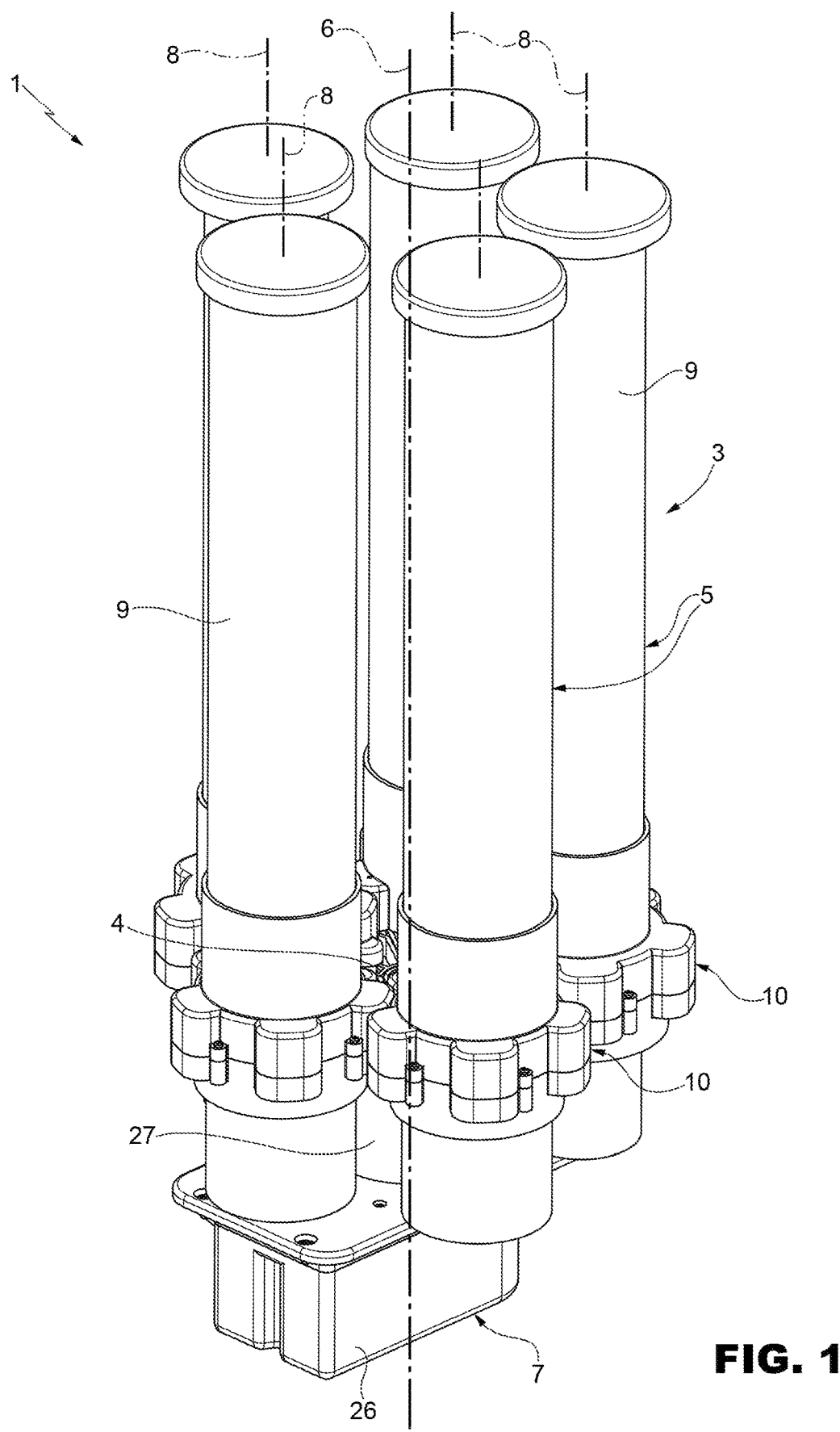
FIG. 1 is a perspective view of a cup dispenser according to a preferred embodiment of the present invention.
Figure 2:
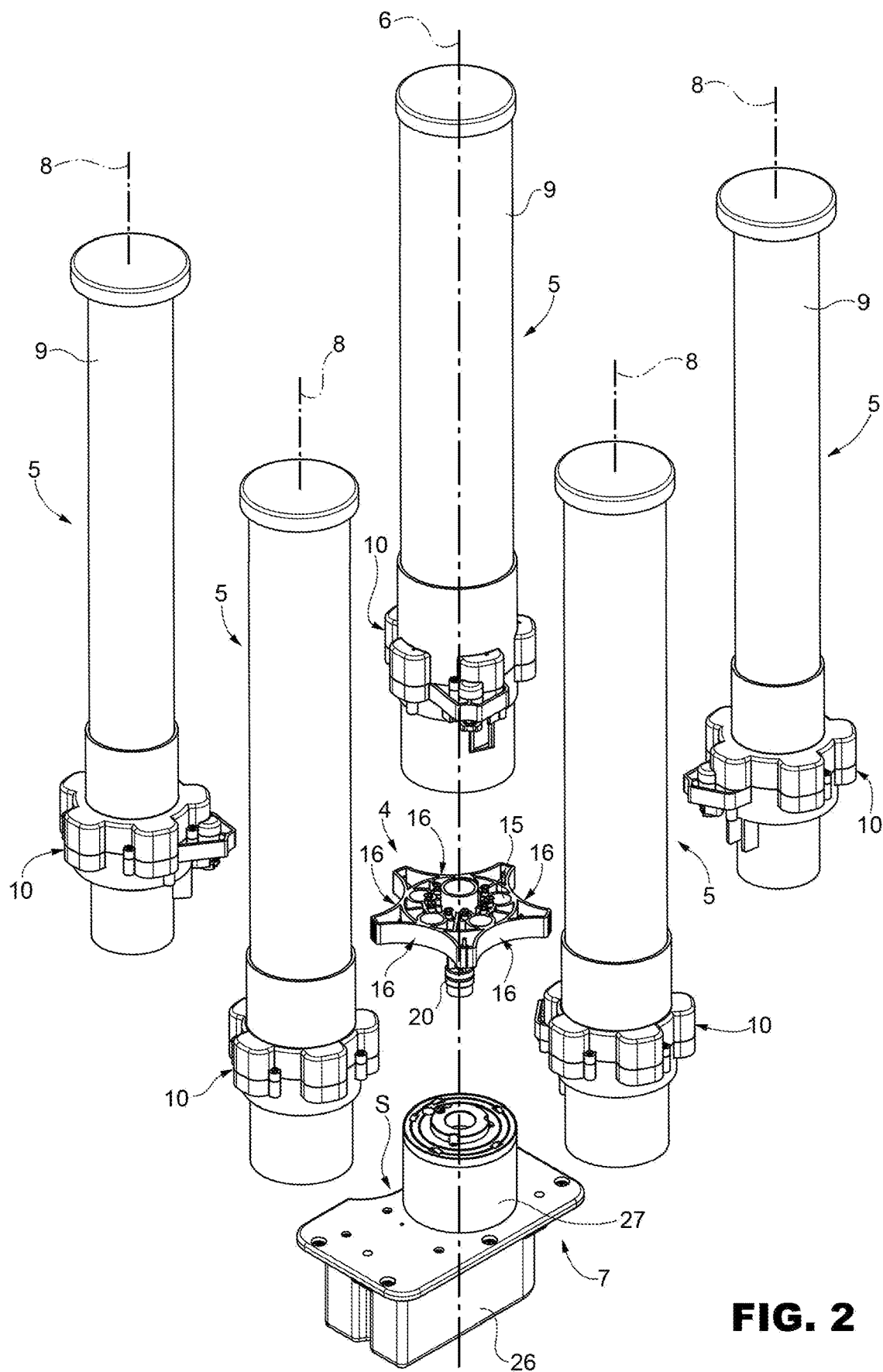
FIG. 2 is an exploded view of the cup dispenser of FIG. 1.

In FIGS. 1 and 2, reference numeral 1 references a cup dispenser in a beverage vending machine (not shown) of the type disclosed in WO 2017/158555 A1, to which reference may be made for a more detailed description.

The cup dispenser 1, of which only the parts necessary for understanding the present invention will be described hereafter, is normally operated at the beginning of a beverage preparation cycle to supply an empty cup 2 to a cup filling station (not shown), wherein the cup 2 is filled with a beverage or with ingredients thereof.

The cup dispenser 1 comprises a cup-holder turret 3 including a column support 4 and a plurality of columns 5 removably mounted on the column support 4 and each adapted to contain a stack of cups 2 with a size equal to, or different from, that of the cups in the other stacks of cups 2.

The cup-holder turret 3 is rotatably mounted about a vertical axis 6 and is operated, in use, by an electronically-controllable actuator assembly 7, which is removably coupled to the cup-holder turret 3, underneath the same, and which will be widely discussed below, to rotate the columns 5 about the axis 6 so as to arrange, each time, one of the columns 5 at a cup release station S, from which the cups 2 are supplied to the aforementioned cup filling station by fall, normally via a chute, or through automated transfer means.

Each column 5 has a longitudinal axis 8 parallel to the axis 6 and comprises a tubular casing 9, which is coaxial with the axis 8, is adapted to contain a stack of cups 2, and is closed at the top by a lid.

Each column 5 is equipped with a cup release device 10, which is arranged at a lower end of the tubular casing 9 and is configured to support the stack of cups 2 in the tubular casing 9 and, when operated, to release a single cup 2 from the bottom of the stack of cups 2.

Preferably, the cup release devices 10 are of a known cam type and each comprises a plurality of spiral-profile rotating members arranged around the axis 8 of the respective column 5 so as to form therebetween an output channel for the cups 2 that are detached, one at a time, from the bottom of the stack of cups 2.

The cup release devices 10 are operable by an electric actuator 11, which is part of the aforementioned actuator assembly 7 and has a drive output designed to couple to a drive input or power take-off of the cup release device 10 arranged in the cup release station S.

In the example shown, the drive input or power take-off of each cup release device 10 comprises a shaft 12, which is rotatably mounted about an axis parallel to the axes 6 and 8 and has, at one end, a grooved conical hole 13 designed to be axially engaged by the aforementioned drive output of the actuator 11 of the cup release device 10 to transfer a rotary motion of the drive output of the actuator 11 to a gear 14 which is keyed on the shaft 12 and defines an input gear of a gear transmission (known and not shown) of the cup release device 10, which gear transmission is designed to simultaneously operate all the spiral-profile rotating members of the cup release device 10.

Figure 3:
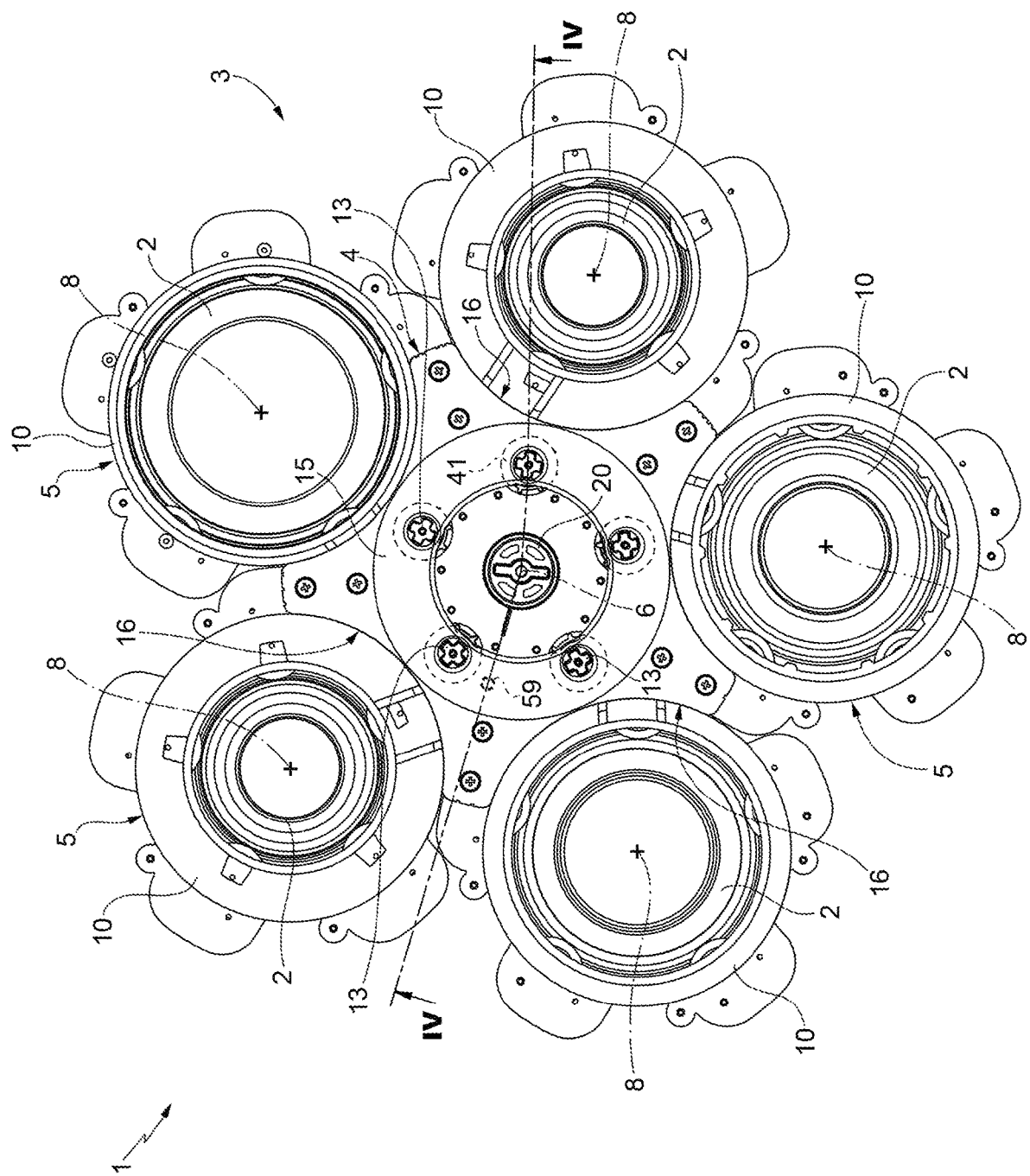
FIG. 3 is a bottom view of the cup dispenser of FIG. 1.
Figure 4:
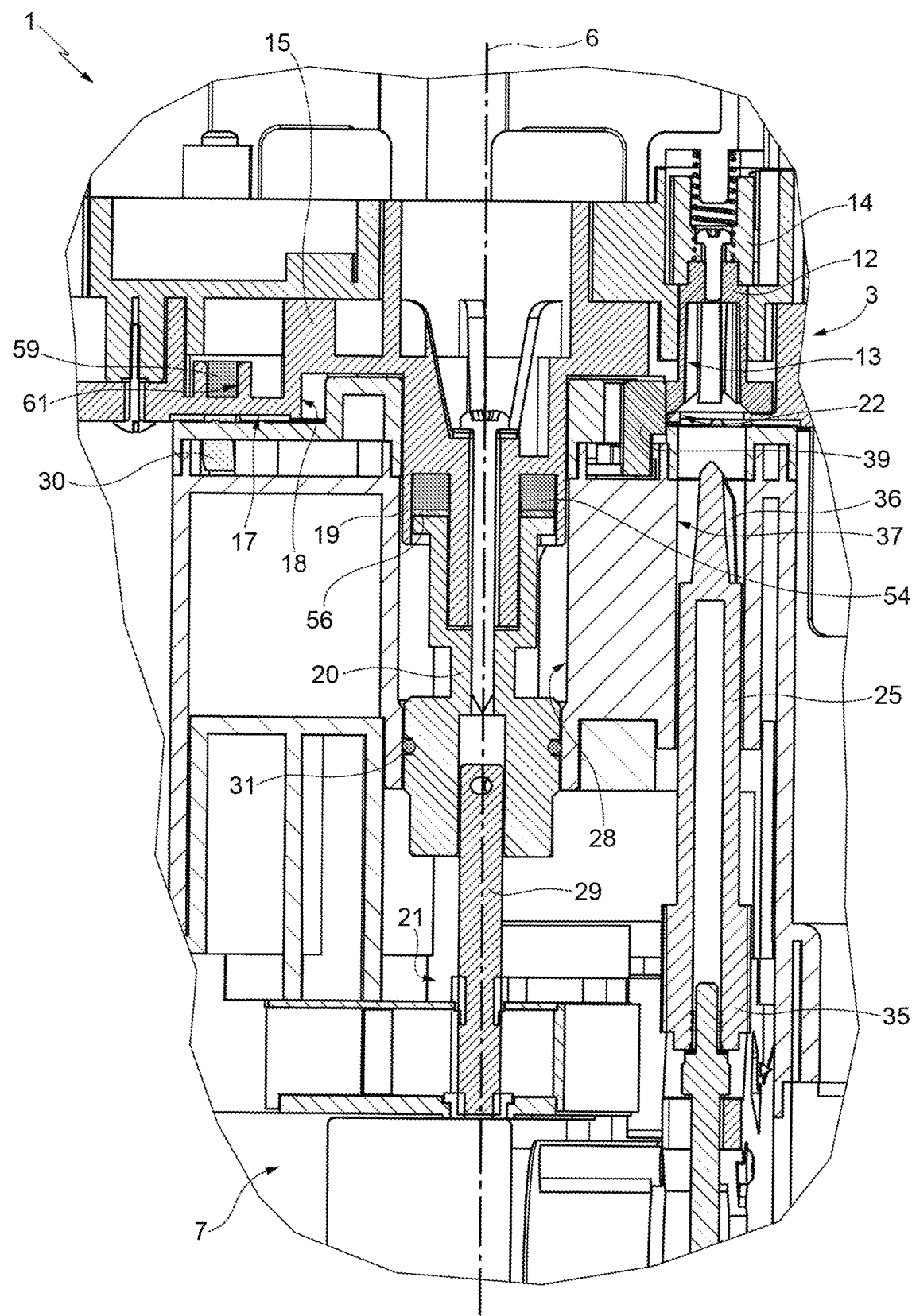
FIG. 4 is a section along line IV-IV in FIG. 3, with parts removed for clarity.
Figure 5:
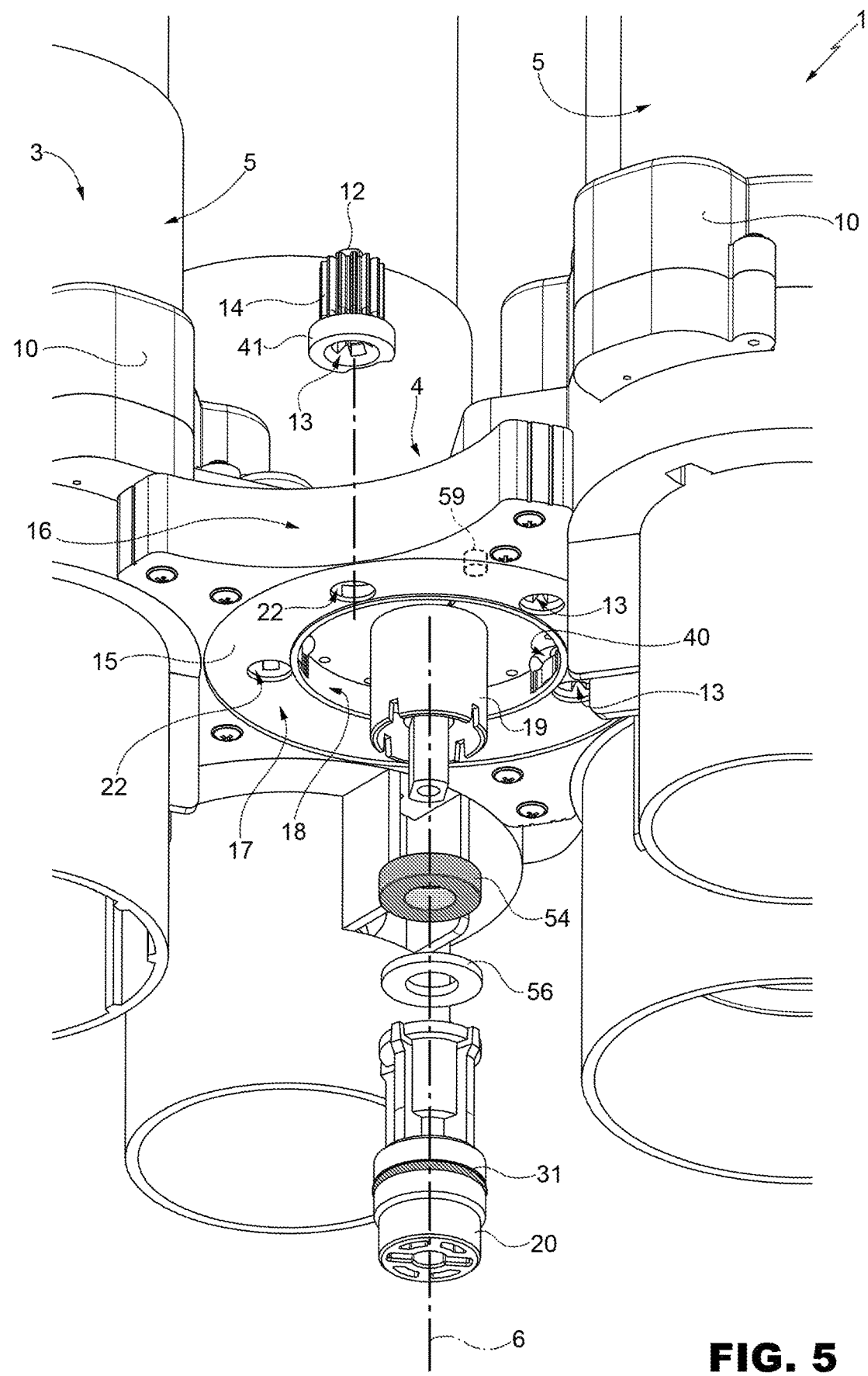
FIG. 5 is a perspective view, on an enlarged scale, with parts removed for clarity and exploded parts, of a detail of FIG. 1.
Figure 6:
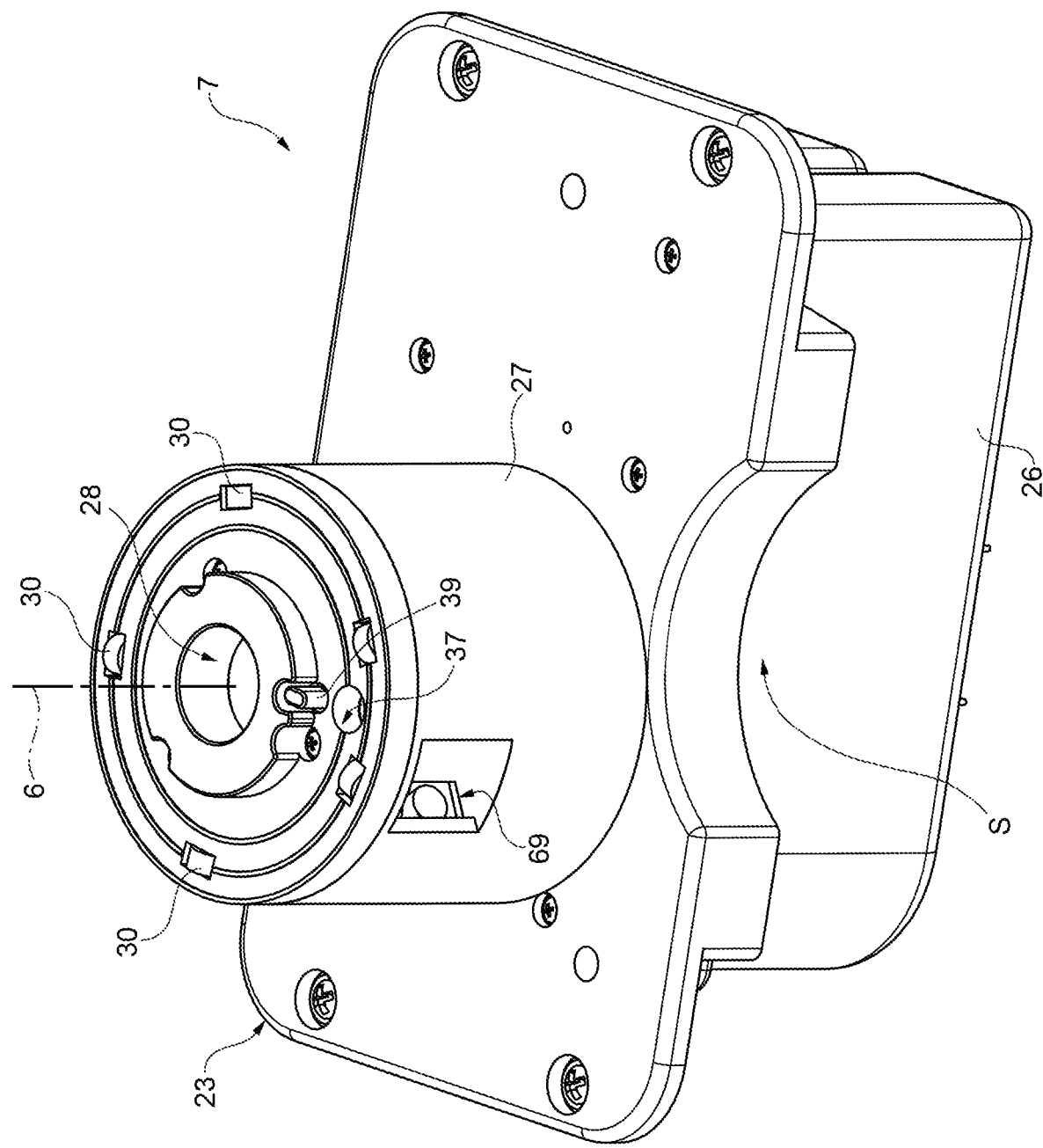
FIG. 6 is a perspective view of an actuator assembly of the cup dispenser of FIG. 1.

As shown in FIGS. 3, 4 and 5, the column support 4 comprises a plate which lies on a plane perpendicular to the axis 6, close to the lower ends of the columns 5, and comprises a central hub 15 coaxial to the axis 6 and a plurality of radial appendages, which define, along the periphery of the central hub 15, seats 16 each engaged by the cup release device 10 of a respective column 5.

The central hub 15 is limited at the bottom by a flat surface 17 perpendicular to the axis 6 and centrally having a circular recessed portion 18 coaxial with the axis 6.

The central hub 15 is provided with a coupling portion or power take-off designed to allow the column support 4 to be kinematically coupled to an electric actuator 21, which is part of the aforementioned actuator assembly 7 and which will be described in more detail below, and cause the column support 4 and, hence, the cup-holder turret 3, to rotate about the axis 6.

In particular, the coupling portion comprises a central sleeve 19, which protrudes downwards from the recessed portion 18 coaxially to the axis 6, and a shank 20 which engages the free end of the sleeve 19 in an angular and axially fixed manner and is designed to couple, in use, to a rotary motion output of the actuator 21.

Preferably, the cup-holder turret 3 has an axial symmetric shape around the axis 6 and, hence, the seats 15 and the cup release devices 10 are evenly distributed around the axis 6.

In particular, as shown in FIG. 3, the cup release devices 10 are coupled to the respective seats 16 in such a way that the respective grooved conical holes 13 are evenly distributed along a circumference coaxial with the axis 6 and engage respective seats formed in the central hub 15 on the opposite side of the sleeve 19 so as to be accessible through respective through holes 22 formed on the surface 17 of the central hub 15 on an annular area surrounding the recessed portion 18.

As shown in FIGS. 2, 6, 7 and 9, the actuator assembly 7 is a compact assembly arranged below the column support 4 and comprises:

a casing 23 and, arranged inside the latter, the actuator 21 to rotate the cup-holder turret 3 about the axis 6 and selectively arrange the columns 5 at the cup release station S, the actuator 11 rotate the shaft 12 of the cup release device 10 arranged in the cup release station S, and a further electric actuator 24 operable to control a movable drive or cup release pin 25 defining the aforementioned drive output or power take-off of the actuator 11 to kinematically couple/decouple the actuator 11 to/from the cup release device 10 arranged in the cup release station S.

Figure 7:
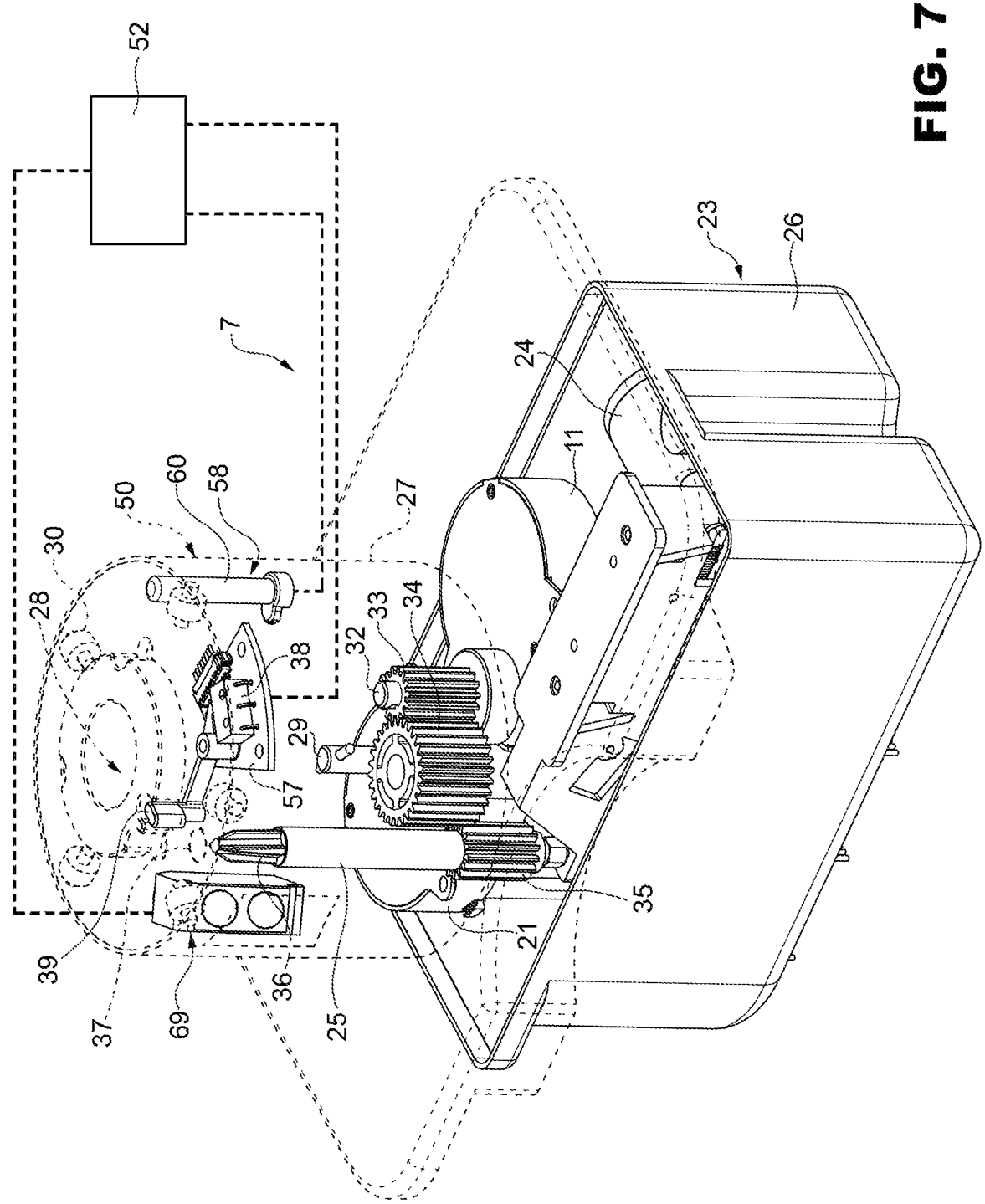
FIG. 7 shows the actuator assembly of FIG. 7 with parts removed for clarity.

In particular, as shown in FIGS. 4 and 7, the casing 23 comprises a lower portion 26, in the example shown with a generally parallelepiped shape, and an upper portion 27, in the example shown of a generally cylindrical shape, with a central cylindrical cavity 28 coaxial with the axis 6 and engaged by the sleeve 19 and by the shank 20 protruding below from the central hub 15.

The shank 20 extends axially inside the cylindrical cavity 28 by a length sufficient for angularly shape-coupling with a pin 29 protruding upwards from the bottom of the cylindrical cavity 28 coaxially with the axis 6 and defining the output member of the actuator 21 housed in the lower portion 26 of the casing 23.

As shown in FIG. 4, the cylindrical cavity 28 is sized, with respect to the shank 20, in such a way as to ensure, between the column support 4 and the actuator assembly 7, a high positioning accuracy, necessary, in use, as will be seen below, to control the angular position of the cup-holder turret 3 with respect to the cup release station S. Preferably, in order to increase the positioning accuracy, a sealing ring 31 is provided in a seat formed at the end of the shank 20 to cooperate with the inner surface of the cylindrical cavity 28 so as to dampen, during operation, vibrations caused by the rotation of the cup-holder turret 3.

Preferably, in order to make the rotation of the cup-holder turret 3 on the actuator assembly 7 stable and smooth, the upper portion 27 of the casing 23 is limited by a flat surface perpendicular to the axis 6 and coupled to the lower surface 17 of the hub 15 by means of a plurality of sliding rollers 30 carried by the upper portion 27 of the casing 23 and arranged to slide, when the cup-holder turret 3 rotates, along an annular area of the surface 17 surrounding the holes 22.

Figure 8:
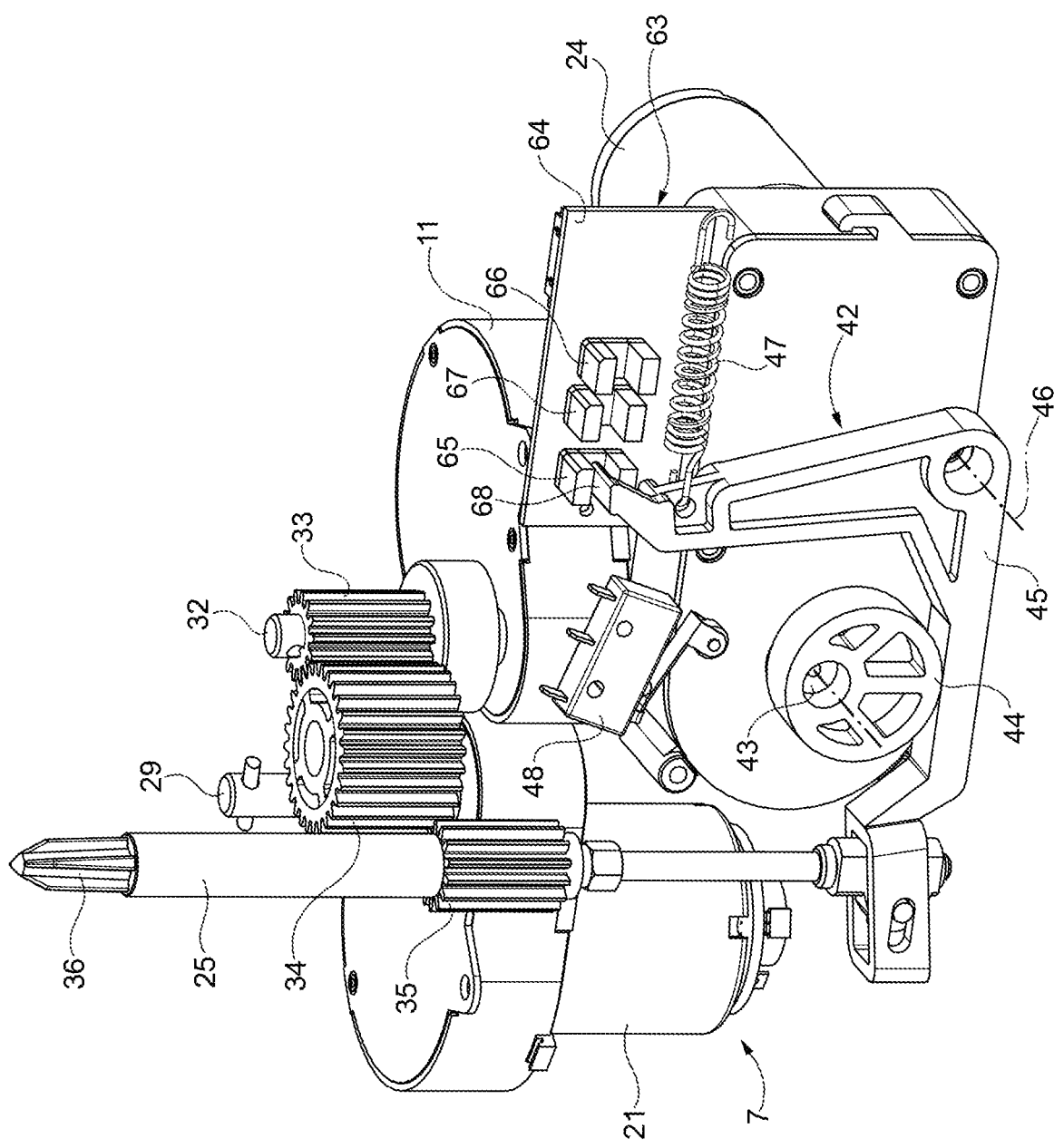
FIG. 8 shows a detail of the actuator assembly of FIG. 7 with parts removed for clarity.

As shown in FIGS. 7 and 8, the actuator 11 has an output shaft 32, which is rotatably mounted to rotate about an axis parallel to the axis 6 and is fitted with a gear 33 coupled to a gear 34 idly supported by the casing 23 and coupled to a gear 35 keyed on a lower end of the drive pin 25 and meshing with the idle gear 34 to kinematically couple the drive pin 25 to the output shaft 32 of the actuator 11 and selectively connect the actuator 11 to the cup release device 10 arranged in the cup release station S.

For this purpose, the drive pin 25 is parallel to the axis 6, extends upwards through the upper portion 27 of the casing 23 and has, at an upper free end thereof, a grooved conical tip 36.

The drive pin 25 is axially movable, under the thrust of the actuator 24, between a normal lowered or retracted rest position (FIG. 10), in which the grooved conical tip 36 is substantially inside the upper portion 27 of the casing 23 (FIG. 7), and an extracted or raised operating position (FIG. 11), in which the grooved conical tip 36 protrudes from the top of the upper portion 27 through a hole 37 and meshes with the grooved conical hole 13 of the cup release device 10 arranged in the cup release station S, thus making the drive pin 25 and the input shaft 12 of the cup release device 10 angularly integral.

When the drive pin 25 is in the extracted operating position, operation of the actuator 11 causes the drive pin 25 and, hence, the input shaft 12 of the cup release device 10 to rotate, thus causing a cup 2 to be released from the stack of cups 2.

A micro-switch 38 is associated to the actuator 11. The micro-switch 38 is housed in the casing 23 and cooperates with a control member 39 which acts on the micro-switch 38 in response to the rotation of the shaft 12 of the cup release device 10 arranged in the cup release position S.

In a preferred embodiment shown in FIGS. 4, 5 and 7, the control member 39 is carried by the casing 23 and comprises a rocker arm with a first arm which defines a control lever 39a to control the micro-switch 38 and a second arm which defines a tappet 39b which protrudes from the top of the casing 23 and engages the recessed portion 18 of the surface 17 of the central hub 15 in an area of the recessed portion 18 aligned with the cup release station S so as to interact, through an opening 40 formed in the central hub 15, with a cam 41 keyed on the shaft 12 of the cup release device 10 arranged in the cup release station S.

As shown in FIG. 5, each shaft 12 is provided with a respective cam 41 facing a respective opening 40 and the cams 41 are so shaped as to cause a displacement of the tappet 39b, with consequent displacement of the control lever 39a that controls the microswitch 38, only when the shaft 12 is arranged and rotated in the cup release station 12.

Figure 9:
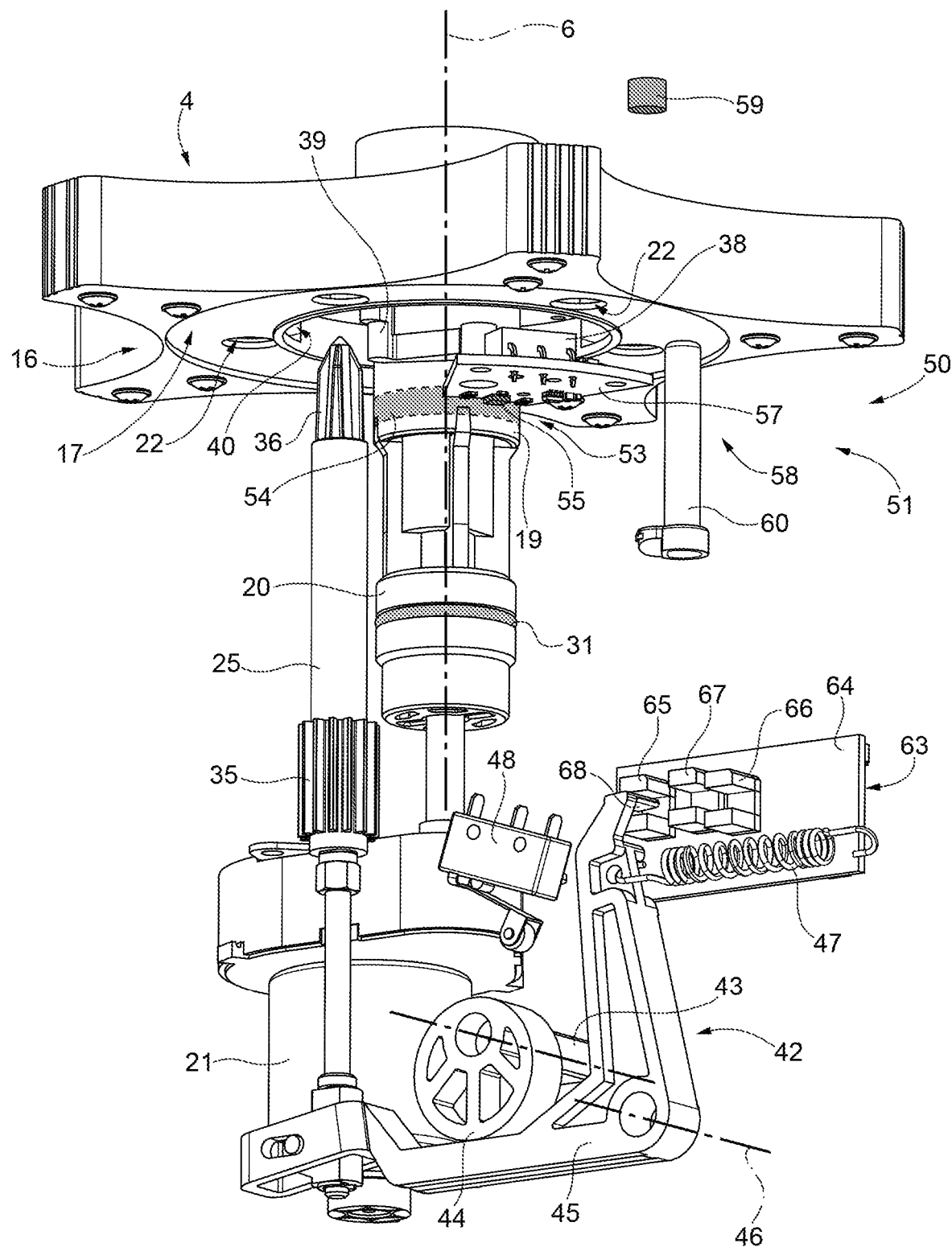
FIG. 9 is a perspective view of a part of the cup dispenser of FIG. 1.

As shown in FIG. 9, the drive pin 25 is moved between the lowered rest position and the raised operating position by the actuator 24 through a transmission mechanism 42 configured to impart to the drive pin 25 a translational motion parallel to the axis 6.

For this purpose, the actuator 24 is preferably a gear motor housed in the lower portion 26 of the casing 23 and with an output shaft 43 mounted to rotate about an axis transverse to the axis 6, and the transmission mechanism 42 comprises a cam 44 keyed on the output shaft 43 and a lever 45, which is mounted to rotate about a fixed axis 46 parallel to the output shaft 43, has a free end hinged, through a slot-pin coupling, to a lower end portion of the drive pin 25 and defines a first arm of a rocker arm pivotably mounted on the axis 46 and comprising a second arm arranged substantially as an L with respect to the lever 45.

An intermediate portion of the lever 45 is arranged in contact with the cam 44 so that a rotation of the cam 44 causes a rotation of the lever 45 about the axis 46. Thanks to the slot-pin coupling between the lever 45 and the drive pin 25, a rotation of the lever 45 results in an axial translation of the drive pin 25.

Figure 10:
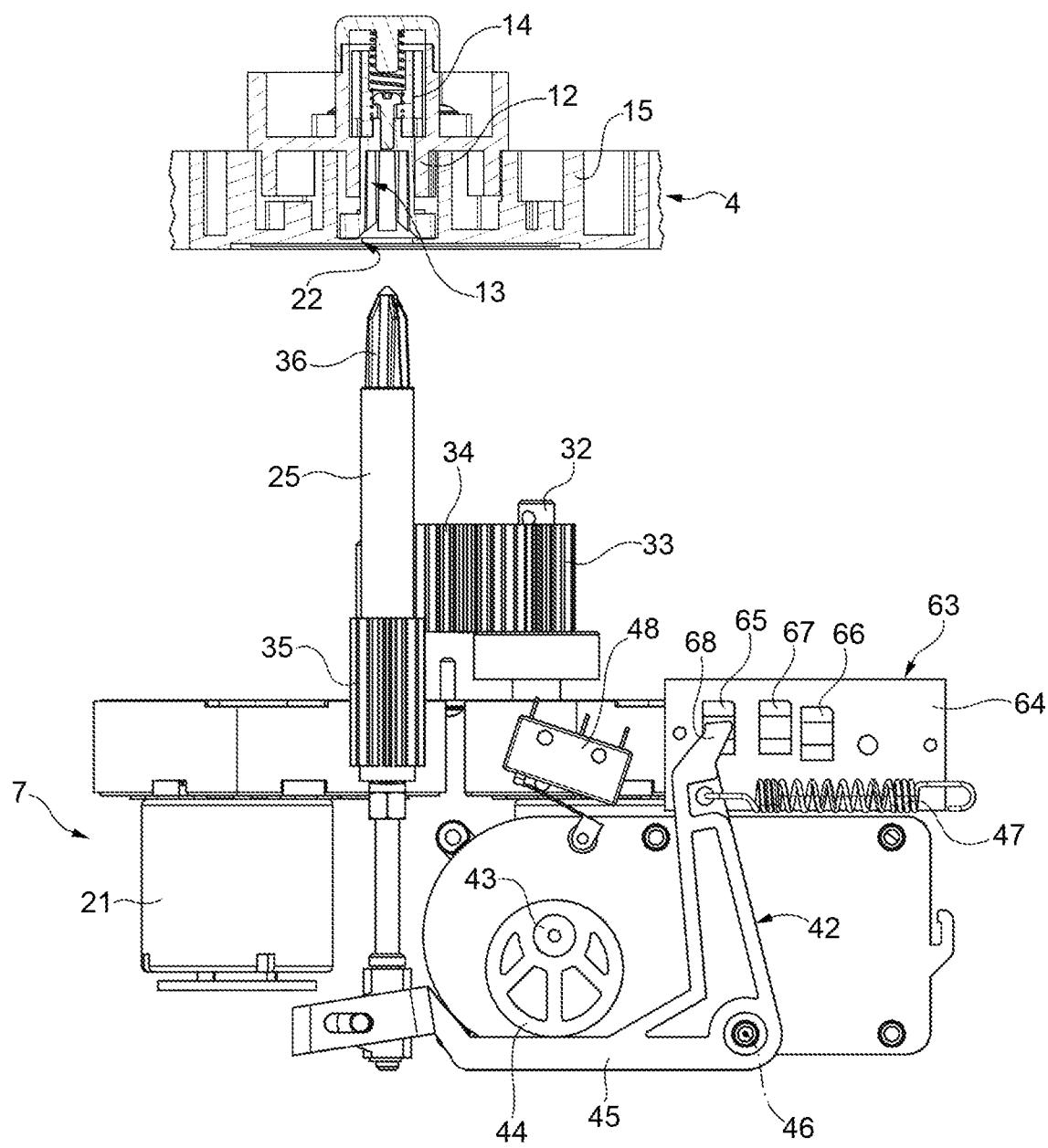
FIGS. 10 and 11 show the detail of the actuator assembly of FIG. 8 in two different operating configurations.

In particular, as shown in FIG. 10, in the lowered rest position of the drive pin 25, the cam 44 keeps the lever 45 rotated downwards against the action of a spring 47 stretched between a fixed point and the free end of the second arm of the rocker arm, and the grooved conical tip 36 is vertically aligned with, but fails to engage, the grooved conical hole 13 of the cup release device 10 arranged in the cup release station S.

Figure 11:
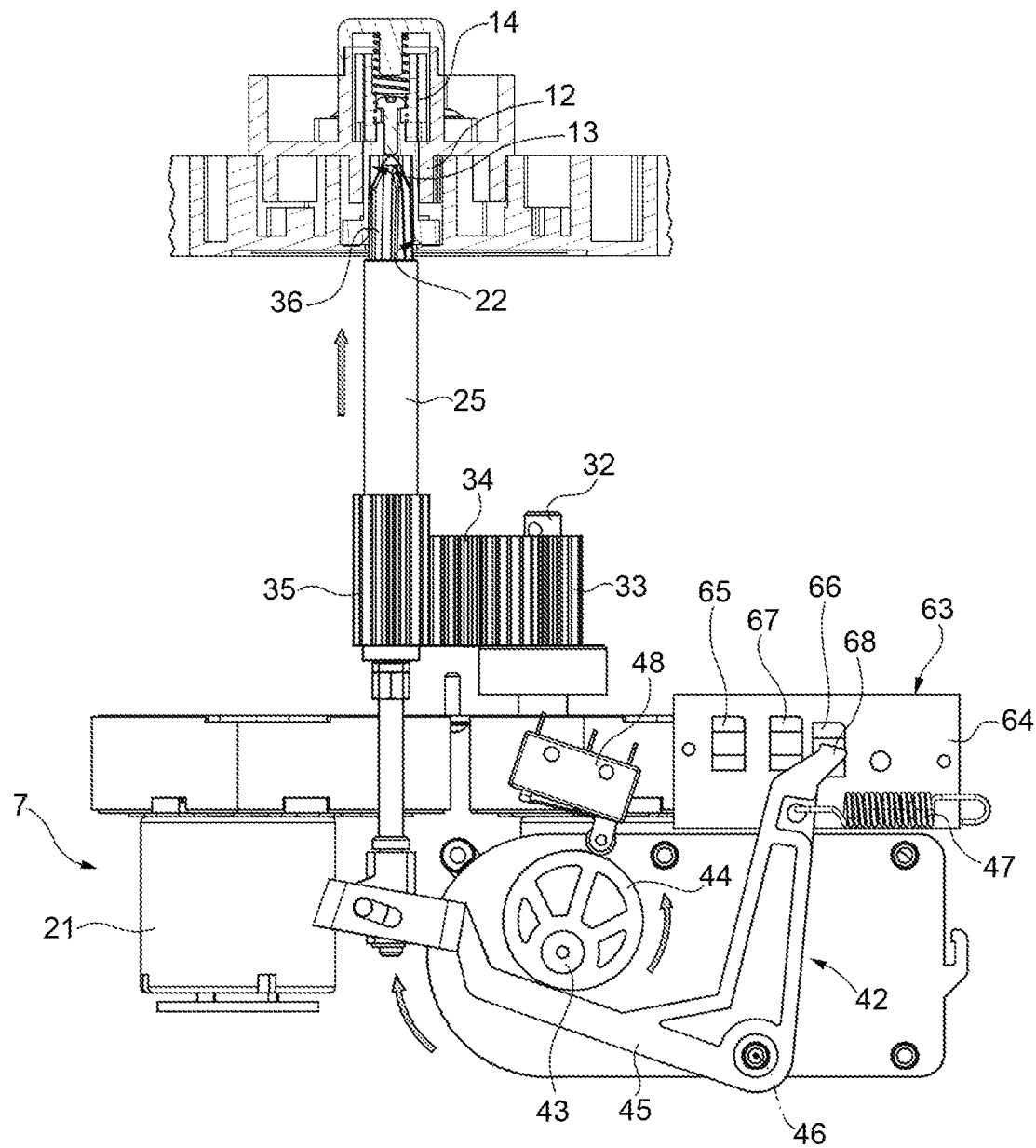

As shown in FIG. 11, in the raised operating position of the drive pin 25, the cam 44 is so arranged as to leave the lever 45 free to rotate upwards under the thrust of the spring 47, with consequent upward movement of the drive pin 25 and frontal engagement of the grooved conical tip 36 in the grooved conical hole 13. In this position, the cam 44 interacts with a micro-switch 48 associated with the actuator 24.

Finally, as shown in FIGS. 7-9, the cup dispenser 1 comprises an electronic control system 50 designed to control operation of the cup dispenser 1 and comprising:
- a sensory system 51 configured to generate electrical outputs such as to allow an absolute angular position of the cup-holder turret 3 to be determined; and
- an electronic control unit 52 electrically connected to the sensory system 51 to receive the electrical signals thereof, and to the actuators 11, 21 and 24 of the actuator assembly 7 to provide electrical commands thereto.

The sensory system 51 comprises a magnetic angular position sensor device 53 designed to output an electrical output indicative of the absolute angular position of the cup-holder turret 3.

The magnetic angular position sensor device 53 comprises:
- a diametrically magnetised permanent ring magnet 54 carried by the cup-holder turret 3 in an axially fixed position coaxial to the axis 6, and
- a magnetic angular position sensor 55 arranged in a fixed position close to the ring magnet 54 so as to output an electrical output indicative of the angular position of the magnetic field generated thereby.

In particular, in the embodiment shown in FIGS. 5 and 9, the ring magnet 54 is carried by the central hub 15, and in particular, in the example shown, is axially fixed, by means of a washer 56, inside the sleeve 19, at the top of the shank 20, so as to rotate integrally with the cup-holder turret 3 about the axis 6.

In a variant not shown, the sleeve 19 and the shank 20 are made in one piece and the ring magnet 54 is arranged internally or externally to the shank 20, in an angularly and axially fixed position.

The magnetic angular position sensor 55 is arranged alongside the ring magnet 54 on a lying plane thereof perpendicular to the axis 6, so as to sense the magnetic field generated by the ring magnet 55 and output an electrical output indicative of the absolute angular position of the magnetic field.

In particular, the magnetic angular position sensor 55 is carried by a printed circuit board 57 which is housed inside the upper portion 27 of the casing 23 of the actuator assembly 7 and on which the micro-switch 38 is also arranged.

The sensory system 51 further comprises a magnetic proximity sensor device 58 configured to output an electrical output such as to allow the electronic control unit 52 to determine when the cup-holder turret 3 is in an initial angular position defined in the design stage.

The magnetic proximity sensor device 58 comprises:
a permanent magnet 59 carried by the column support 4, in an offset position relative to the axis 6, so as to move along a circular path around the axis 6 during rotation of the cup-holder turret 3 about the axis 6, and
a Hall effect sensor 60 arranged in a fixed position so as to sense the magnetic field generated by the permanent magnet 59 when the cup-holder turret 3 is in the initial angular position.

In particular, the permanent magnet 59 is housed inside a corresponding seat 61 (FIG. 4) formed in the column support 4, and the Hall effect sensor 60 is housed in a corresponding seat formed inside the upper portion 27 of the casing 23 of the actuator assembly 7, below the column support 4, so as to vertically facing the permanent magnet 59 when the cup-holder turret 3 is in the initial angular position.

The sensor system 51 further comprises a further position sensor device 63 configured to output an electrical output such as to allow the electronic control unit 52 to determine the position of the drive pin 25 during its movement to and from the kinematic coupling position in which the drive pin 25 is kinematically coupled with the drive input or power take-off 12 of the cup release device 10 arranged in the cup release station S.

The position sensor device 63 is designed to output an electrical output such as to allow the electronic control unit 52 to determine when the drive pin 25 assumes:
the retracted rest position shown in FIG. 10, in which the grooved conical tip 36 remains substantially inside the upper portion 27 of the casing 23,
the extracted operating position shown in FIG. 11, in which the grooved conical tip 36 protrudes from the top of the upper portion 27 through the hole 37 and engages the grooved conical hole 13 of the cup release device 10 arranged in the cup release station S, thus making the drive pin 25 and the input shaft 12 of the cup release device 10 angularly integral, and
an intermediate drive start position (not shown), intermediate between the retracted and extracted positions, in which the grooved conical tip 36 begins to engage a hole 22, as better described below.

In the embodiment shown in FIGS. 9, 10 and 11, the position sensor device 63 comprises a printed circuit board 64 housed inside the upper portion 27 of the casing 23 of the actuator assembly 7 and on which three sensors 65, 66 and 67 are arranged to detect the position of a projection 68 formed at the free end of the second arm of the rocker arm pivotably mounted on the axis 46, when the drive pin 25 assumes the above three positions.

In particular, as shown in FIGS. 10 and 11, in the retracted rest position of the drive pin 25, the projection 68 interacts with the sensor 65, in the extracted operating position of the drive pin 25, the projection 68 interacts with the sensor 66, and in the engagement start position (not illustrated) the projection 68 interacts with the sensor 67 which is arranged between the sensors 65 and 66.

As shown in FIG. 7, the sensory system 51 further comprises an optical sensor 69 mounted on the actuator assembly 7 in a position such as to allow the electronic control unit 52 to detect the presence or absence of the cups 2 inside a column 5, when the latter reaches the cup release station S, to stop in it or to traverse it, and, consequently, to rotate the cup-holder turret 3 when the column 5 arranged in cup the release station S in empty.

According to a further aspect of the invention, the electronic control unit 52 is programmed to receive the electrical outputs of the magnetic angular position sensor 55 of the magnetic angular position sensor device 53, of the Hall effect sensor 60 of the magnetic proximity sensor device 58 and of the sensors 65, 66 and 67 of the position sensor device 63 and, based on the received electrical outputs, initialise the angular position of the cup-holder turret 3 by using the drive pin 25 as a probe for searching and determining the angular positions of the holes 22 formed in the central hub 15 of the column support 4.

In particular, the electronic control unit 52 is configured to:
i) operate the actuator 21 to rotate the cup-holder turret 3 in a first rotation direction;
ii) operate the actuator 24 to move the drive pin 25 from the retracted rest position towards the extracted operating position, so as to cause it interfere with, and crawl over, the surface 17 of the central hub 15 of the column support 4 during rotation of the cup-holder turret 3;
iii) sense when the drive pin 25 starts to engage a hole 22 based on the electrical output of the position sensor 67;
iv) in response to the detection, based on the electrical output of the position sensor 67, that the drive pin 25 starts to engage a hole 22:
    store the absolute angular position where the drive pin 25 starts to insert in the hole 22 indicated by the electrical output of the magnetic angular position sensor 55 of the magnetic angular position sensor device 53,
    operate the actuator 21 to stop the rotation of the cup-holder turret 3, and
    operate the actuator 24 to extract the drive pin 25 from the hole 22 and, conveniently, bring it back to the retracted position;
v) repeat steps i) to iv) to cause the cup-holder turret 3 to make a full rotation in the first rotation direction and thus search for all the holes 22 formed in the central hub 15 of the column support 4 and compute and store the absolute angular positions where the drive pin 25 starts to insert in the holes 22 during rotation of the cup-holder turret 3 in the first rotation direction;

vi) repeat steps i) to v), with an inverted rotation direction of the cup-holder turret 3, to cause the cup-holder turret 3 to complete a full rotation in a second rotation direction opposite to the first rotation direction and thus search for all the holes 22 formed in the central hub 15 of the column support 4 and store the absolute angular positions where the drive pin 25 starts to insert in the holes 22 during rotation of the cup-holder turret 3 in the second rotation direction; and
vii) compute the absolute angular positions of centres of the holes 22 formed in the central hub 15 of the column support 4 based on the absolute angular positions where the drive pin 25 starts to insert in the holes 22 during rotation of the cup-holder turret 3 in the two rotation directions.

Conveniently, the electronic control unit 52 is programmed to compute the absolute angular position of the centre of a hole 22 as the average value of the two absolute angular positions where the drive pin 25 starts to insert in the hole 22 and computed in the two rotation directions of the cup-holder turret 3.

Furthermore, the electronic control unit 52 is conveniently programmed to identify and store, during initialisation, the initial angular position of the cup-holder turret 3 based on electrical output of the Hall effect sensor 60 of the magnetic proximity sensor device 58.

The invention claimed is:
1. A cup dispenser for a beverage vending machine, the cup dispenser comprising:
a cup-holder turret rotatably mounted to rotate about a rotation axis and including a column support configured to support a plurality of columns arranged around the rotation axis and each adapted to contain a respective stack of cups and provided with an associated cup release device operable to release individual cups from the stack of cups;
an electronically-controllable actuator assembly to move the cup-holder turret and operate the cup release devices;
wherein the electronically-controllable actuator assembly comprises:
a first electric actuator to rotate the cup-holder turret about the rotation axis to selectively bring the columns to a fixed cup release station; and
a second electric actuator to operate the cup release device associated with the column arranged in the cup release station;
an electronic control system to control operation of the cup dispenser, wherein the electronic control system comprises:
a sensory system configured to output an electrical output such as to allow an angular position of the cup-holder turret to be determined; and
an electronic control unit electrically connected to the sensory system to receive the electrical output thereof, and to the first and second actuators of the actuator assembly to supply electric commands thereto;
wherein the sensory system comprises a magnetic angular position sensor device configured to output an electrical output such as to allow the electronic control unit to determine the absolute angular position of the cup-holder turret;
wherein the magnetic angular position sensor device comprises:
a diametrically magnetized permanent ring magnet carried by the cup-holder turret in an axially fixed position coaxial to the rotation axis of the cup-holder turret, so as to result in the diametrically magnetized permanent ring magnet rotating together with the cup-holder turret, and
a magnetic angular position sensor carried by the actuator assembly so as to be arranged in a fixed position outside the ring magnet, close to, and alongside, the ring magnet, on a lying plane of the ring magnet transverse to the rotation axis, so as to result in the magnetic angular position sensor outputting an electrical output indicative of the absolute angular position of the magnetic field generated by the ring magnet.

2. The cup dispenser of claim 1, wherein the column support comprises a central hub coaxial to the rotation axis and coupled to an output shaft of the first actuator to receive therefrom a rotary motion and rotate the cup-holder turret;
wherein the ring magnet is carried by the central hub and the magnetic angular position sensor is carried by the actuator assembly so as to result, when the central hub is coupled to the actuator assembly, in the magnetic angular position sensor being arranged outside the ring magnet, on the lying plane of the ring magnet.

3. The cup dispenser of claim 2, wherein the central hub comprises a coupling portion to kinematically couple the column support to the first actuator;
wherein the output shaft of the first actuator is arranged inside a cavity of a box-like casing of the actuator assembly axially engaged by the coupling portion of the central hub;
wherein the ring magnet is carried by the coupling portion of the central hub and the magnetic angular position sensor is carried by the casing so as to result, when the coupling portion engages the cavity, in the ring magnet and the magnetic angular position sensor being arranged alongside on the lying plane.

4. The cup dispenser of claim 1, wherein the sensory system further comprises a magnetic proximity sensor device configured to output an electrical output such as to allow the electronic control unit to determine when the cup-holder turret is in an initial angular position;
the magnetic proximity sensor device comprises:
a permanent magnet carried by the column support, in a offset position relative to the rotation axis, so as to move along a circular path around the rotation axis during rotation of the cup-holder turret around the rotation axis, and
a Hall effect sensor arranged in a fixed position so as to sense the magnetic field generated by the permanent magnet when the cup-holder turret is arranged in the initial angular position.

5. The cup dispenser of claim 1, wherein the actuator assembly further comprises:
a power take-off driven by the second actuator; and
a third electric actuator to selectively move the power take-off to and from a kinematic coupling position in which the power take-off is coupled with a power intake of the cup release device arranged in the cup release station;
wherein the column support is formed with through openings, each of which is associated with a respective column so as to be traversed, when the associated column is arranged in the cup release station, by the power take-off during its movement to and from the kinematic coupling position in which the power take-off is coupled with the power intake of the cup release device arranged in the cup release station;

wherein the sensory system further comprises an additional position sensor device configured to output an electrical output such as to allow the electronic control unit to determine a position of the power take-off during its movement to and from the kinematic coupling position in which the power take-off is coupled with the mechanical power source of the cup release device arranged in the cup release station; and wherein the electronic control unit is further configured to initialize the cup-holder turret by using the power take-off as a probe to search for and store absolute angular positions of the through openings in the column support.

6. The cup dispenser of claim 5, wherein in order to initialize the cup-holder turret, the electronic control unit is configured to:

i) operate the first actuator to cause the cup-holder turret to rotate in a first rotation direction;

ii) operate the third electric actuator to cause the power take-off to move towards the kinematic coupling position in which the power take-off is coupled with the power intake of the cup release device arranged in the cup release station, so as to cause the power take-off to interfere with, and crawl over, a surface of the column support during rotation of the cup-holder turret, iii) sense when the power take-off starts to insert in a through opening based on the electrical output of the position sensor device, iv) in response to sensing that the power take-off starts to insert in a through opening:

store the absolute angular position where the power take-off starts to insert in the through opening, operate the first actuator to stop rotation of the cup-holder turret, and operate the third actuator to extract the power take-off from the through opening, v) repeat steps i) to iv) to cause the cup-holder turret to complete a full rotation in the first rotation direction so as to search for all the through openings in the column support and store the absolute angular positions where the power take-off starts to insert in the through openings during rotation of the cup-holder turret in the first rotation direction;

vi) repeat steps i) to v), with an inverted rotation direction of the cup-holder turret, to cause the cup-holder turret to complete a full rotation in a second rotation direction opposite to the first rotation direction so as to search for all the through openings in the column support and store the absolute angular positions where the power take-off starts to insert in the through openings during rotation of the cup-holder turret in the second rotation direction; and vii) compute the absolute angular positions of the centers of the through openings in the column support based on the absolute angular positions where the power take-off starts to insert in the through openings during rotations of the turret cup storage in the two rotation directions.

7. The cup dispenser of claim 6, wherein in order to initialize the cup-holder turret, the electronic control unit is further configured to:

compute the absolute angular position of the center of a through opening in the column support as an average of the two absolute angular positions where the power take-off starts to insert in the through opening and computed in the two rotation directions of the cup-holder turret.

8. The cup dispenser (1) of claim 4, wherein in order to initialize the cup-holder turret, the electronic control unit is further configured to:

find and store the initial angular position of the cup-holder turret based on the electrical output of the Hall effect sensor of the magnetic proximity sensor device.

9. The cup dispenser of claim 4, wherein the first, second, and third electric actuators, the magnetic angular position sensor, and the Hall effect sensor are grouped so as to form a compact assembly housed in a box-shaped casing arranged below the cup-holder turret.

10. The cup dispenser of claim 5, wherein the power take-off comprises a drive pin with a grooved conical tip designed to mesh with a grooved conical hole formed in each cup release device.

11. A beverage vending machine comprising the cup dispenser of claim 1.

* * * * *